W. H. McNary.
Knit Fabric.

No. 428. Reissued Feb. 17, 1857.

UNITED STATES PATENT OFFICE.

WILLIAM H. McNARY, OF BROOKLYN, NEW YORK.

IMPROVEMENT IN THE MANUFACTURE OF HOSIERY.

Specification forming part of Letters Patent No. 16,285, dated December 23, 1856; Reissue No. 428, dated February 17, 1857.

*To all whom it may concern:*

Be it known that I, W. H. McNARY, of the city of Brooklyn, in the county of Kings and State of New York, have invented a new and useful Improvement in the Manufacture of Hosiery; and I do hereby declare that the following is a full, clear, and exact description of the same, reference being had to the accompanying drawings, forming part of this specification.

This invention consists in a certain mode of operation by which the heel of a piece of hosiery, and the toe also if desired, may be produced of a proper form without a seam by knitting continuously from the leg toward the foot, or from the foot toward the leg, without removing the work from the needles, thereby not only expediting the manufacture, but at the same time producing a better and neater article.

The invention may be carried out by means of either the circular or straight knitting machine, but with more advantage by means of the circular-machine, as with that machine it enables a perfectly seamless, well-shaped stocking to be produced.

I will first describe with reference to the accompanying drawings the manner in which the invention is performed by the circular-machine, and then a few words of explanation will suffice to show how it may be performed on a straight-machine.

Figure 1:
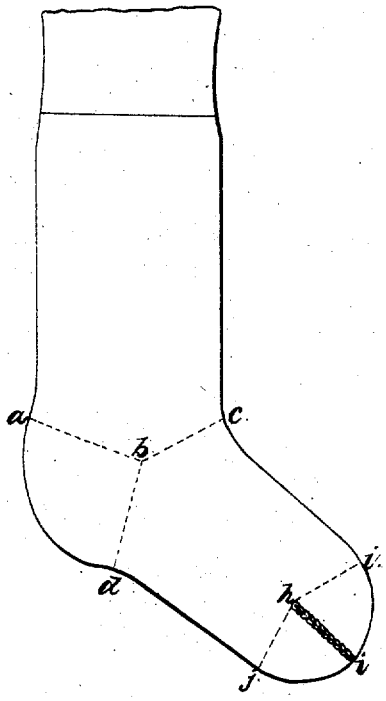

Figure 1 exhibits a side view of a sock. The leg is knitted in the usual manner as far as the line *a b c*, where the heel commences. It must be observed that before the heel commences this line is perfectly straight all the way round the stocking, but when the heel and foot are knitted on it is made to appear in the side view of the form shown. When the leg is thus completed, a row of stitches, or two or more rows if the machine is constructed to knit two or more rows together, as is sometimes the case, is knitted from the point *b*, round past *a*, to a corresponding point, *b*, on the opposite side of the sock, which is supposed to be exactly half-way round, leaving the other half of the stitches from *b*, round past *c*, to the opposite corresponding point, *b*, upon the needles. A second row of stitches is then knitted in the opposite direction onto the last-mentioned row, but is commenced at one end on the second stitch and carried only to the last stitch but one of the former row, leaving the last stitch on the needle on which it was formed. A third row is then knitted in the reverse direction on the second row, commencing on the second stitch, and proceeding only as far as the last stitch but one of the second row, leaving the last stitch on the needle on which it was formed. A fourth row is knitted on the third row in the same way, and in this way the knitting is always continued back and forth to the last stitch but one of the preceding row, which is always left on the needle, thus reducing the number of stitches in every successive row of knitting, but always keeping the same number of stitches on the needles. Instead of dropping only one stitch at each end of the row, two or more may be dropped in the same way. By the above means a piece of knitting of the form of a portion of a sphere, or a rounded form approximating thereto, is produced which conforms very nearly to the natural shape of the human heel. After the knitting in the above manner has been carried on as far as desirable, which is generally till the row is reduced to a very small number of stiches, the knitting commences again all the way round the needles, which can be done at the end of any row knitted in the aforesaid manner, as there is always the same number of stitches on the needles. The line *d b c* represents the line where the knitting is commenced all round again to form the foot, and the part included between the lines *a b* and *d b* shows the spherically-knitted part constituting the heel.

Figure 2:
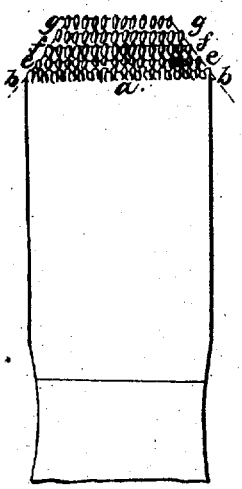

I will attempt to exhibit in Fig. 2, the manner in which the heel is produced, which may serve to illustrate the operation more clearly than the foregoing description. This view is a back view of the leg of the stocking, having a few rows of the heel stitches knitted on the leg, being represented in the inverted position it occupies in the machine. Of course only the half of the leg which is to have the heel knitted to it is visible in the back view. The line where the knitting of the leg in a complete circle ceases is indicated by *b a b*, to correspond with the letters of reference in Fig. 1. The line of loops *e e* represents the first row knitted half-way round to commence the heel, the line of loops *f f* the second row, and the line *g g* the third row; and it will be seen that each row has one stitch less than its predecessor at each end. This figure does not give an absolutely correct representation of the heel-knitting, as it really appears, for the edge indicated by the red line would be held straight on the needles and the heel knitting would bulge out; but this is the only way to represent it so as to give an idea of the relative arrangement of the rows of knitting. This mode of knitting the heel in a rounded form is, as far as known to me, an entirely new feature in the manufacture of hosiery.

Figure 3:
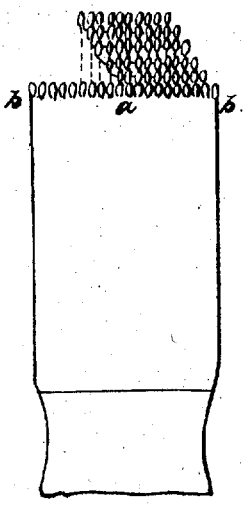

Fig. 3 exhibits another way of forming the heel on the same principle. This is a back view of similar character to Fig. 2. The leg is knitted as far as the line *a b c*, as shown in Fig. 1, in the same way as before described, and then a row of stitches is commenced from the same point *b*, as before described, and extended a little beyond the centre *a* of the back of the leg. A second row is knitted on the first row back again toward *b*, but terminated, as before described, on the last stitch but one of the first row, and a third row is commenced on the second stitch of the second row and carried one stitch beyond and knitted to that stitch on the line *b a b*, which is the same line as *a b c*, Fig. 1, next beyond where the first row terminated. A fourth row is commenced on the next stitch still farther along the line *a b c*, and carried back again to the last stitch but one of the third row. A fifth row is then knitted back again from the second stitch of the fourth row and extended one stitch beyond the last stitch thereof, and knitted to the next stitch of the line *a b c*, and so on.

In consequence of the difficulty of representing the piece thus formed to produce the heel, owing to its bulging out, I have not shown the last stitches at the left-hand end connected with the row of stitches *b a b*, but merely shown dotted lines to indicate which stitches on the line *b a b* the several rows of heel-stitches connect with. When this piece is knitted to extend to the opposite point, *b*, to that where it was commenced, a second piece of the same form is commenced upon it from the last named or left-hand point, *b*, and worked in the opposite direction, and by working two or more pieces in this way the heel is completed, and the foot may be commenced as described with reference to Fig. 1. This last method of performing my invention is inferior to that first described, as it does not give so neat an appearance to the work, and is only described to show that the rounded piece may be produced in more ways than one by the same principle of operation.

The toe may be produced of a rounded form in either of the ways above described. The toe represented in Fig. 1, which has a seam at *h i*, is supposed to be produced after proceeding with the circular knitting of the foot all round from the line *c b d* to the line *j i*, where the toe is to commence, and then knitting half-way round in either of the ways above described to produce a piece of the form of a portion of a sphere, or of a rounded form approximating thereto, like the heel-piece, and then a piece of similar form on the other half, and knitting the edges together, thus leaving the seam *h i* where the said edges meet, or by knitting half-way round from one side to form a piece of nearly hemispherical form, the seam may be brought in the line *h j* or *h i*.

Hosiery with seamless toes may be produced on the same principle by knitting the toe first, commencing to knit on one-half the needles in either of the modes above described of producing the heel till a piece is produced forming a sufficient portion or bearing a sufficient resemblance to a sphere. This piece is then put on the whole of the needles, and the knitting is proceeded with all round it to commence the foot, which is knitted all round the needles as far as the line *d b c*, and then the knitting on one-half the needles only is commenced again to form the heel. After the heel is completed, the knitting all round the needles is proceeded with again to make the leg.

Though I consider it best to make the heel and toe of the stocking of forms approximating to portions of spheres, I will remark that I have used the same mode of knitting to produce heels of spheroidal or of only very slightly rounded form, and also to bring the heel nearly or quite to a point. The same results may be obtained in a straight-knitting machine by making the seam up the front of the hose instead of up the back, as is the common practice; but the particular mode of operation need not be here described, as the description of the application of the invention to circular knitting will enable persons skilled in the art to adapt it to a straight-machine.

I do not confine myself to the use of any particular machinery to produce the results herein described; but

What I claim as my invention, and desire to secure by Letters Patent, is—

The production of the heels and toes of hosiery by knitting a piece of spherical or other other suitable form on the cylindrical or straight portions of the leg or foot by any mode of operation in which the stitches are dropped or left upon the needles and taken up again, substantially as herein described, whereby the whole of the leg and foot is enabled to be produced by a continuous operation of the machinery or devices employed.

WM. H. McNARY.

Witnesses:
JAMES F. BUCKLEY,
J. W. COOMBS.